(12) United States Patent
Cavazos Sepulveda (10) Patent No.: US 12,241,020 B2
(45) Date of Patent: Mar. 4, 2025

(54) METHOD AND APPLICATIONS OF NONSTOICHIOMETRIC IONIC EMULSIONS

(71) Applicant: SAUDI ARABIAN OIL COMPANY, Dhahran (SA)

(72) Inventor: Adrian Cesar Cavazos Sepulveda, Garcia (MX)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 177 days.

(21) Appl. No.: 17/729,688

(22) Filed: Apr. 26, 2022

(65) Prior Publication Data

US 2023/0340317 A1     Oct. 26, 2023

(51) Int. Cl.
    *C09K 8/584*         (2006.01)
    *C09K 8/594*         (2006.01)
    *E21B 41/00*          (2006.01)

(52) U.S. Cl.
    CPC .............. *C09K 8/584* (2013.01); *C09K 8/594* (2013.01); *E21B 41/0064* (2013.01)

(58) Field of Classification Search
    CPC .................................................. C09K 8/594
    See application file for complete search history.

(56) References Cited

U.S. PATENT DOCUMENTS

2008/0207452 A1*   8/2008   Kramer ................... A01N 33/04
                                                           504/148
2015/0034310 A1*   2/2015   Brennecke ............. C09K 8/594
                                                           166/250.12
2020/0017776 A1*   1/2020   Weers .................... C09K 8/524
2022/0154066 A1*   5/2022   Acosta ...................... C09K 8/74

FOREIGN PATENT DOCUMENTS

EP          1920824 A1     5/2008
IN           324764 B     11/2019

OTHER PUBLICATIONS

Greaves, Tamar L., et al. "Diversity observed in the nanostructure of protic ionic liquids", The Journal of Physical Chemistry B. Aug. 12, 2010, pp. 10022-10031, [10 Pages].
(Continued)

*Primary Examiner* — William D Hutton, Jr.
*Assistant Examiner* — Avi T Skaist
(74) *Attorney, Agent, or Firm* — Osha Bergman Watanabe & Burton LLP (57) ABSTRACT

Methods are disclosed for synthesizing ionic liquid formulations using non-stoichiometric hydrophobic or hydrotropic ionic liquids, including aprotic or protic ionic liquids, to create emulsions, microemulsions, or nanoemulsions. Additionally, the provided ionic liquid formulations may be used to make surfactant-free or detergentless microemulsions or nanoemulsions that may be used as additives for aqueous or oil-based solutions. Methods for introducing an ionic liquid in an injection fluid into a reservoir via an introduction well area also provided. The injection fluid intermingles with reservoir fluid and the intermingled injection fluid and reservoir fluid is retrieved via a production well. Methods for introducing an ionic liquid in an injection fluid may be used for CO2 sequestration within a reservoir. The CO2 may be introduced concurrently or by alternating injections of CO2.

10 Claims, 3 Drawing Sheets

(56) References Cited

OTHER PUBLICATIONS

Hayes, Robert, et al. "Structure and nanostructure in ionic liquids", Chemical reviews. Jul. 8, 2015, pp. 1-70, [70 Pages].

Berton, Paula, et al. "Elucidating the triethylammonium acetate system: Is it molecular or is it ionic?", Journal of Molecular Liquids. Aug. 2018, pp. 126-131, [6 Pages].

Rodriquez-Escontrela, Iria, et al. "Ionic liquids for low-tension oil recovery processes: Phase behavior tests", Journal of colloid and interface science 505. May 2017, pp. 404-416, [13 Pages].

Bera, Achinta, et al. "Ionic liquids as alternatives of surfactants in enhanced oil recovery—a state-of-the-art review", Journal of Molecular Liquids. Dec. 2016, pp. 177-188, [12 Pages].

Bauduin, P., et al. "Solubilization in alkanes by alcohols as reverse hydrotropes or 'lipotropes'", The Journal of Physical Chemistry B. 2008, Oct. 2008, pp. 12354-12360, [7 Pages].

Subbarao, Chirravuri V., et al. "Functions of hydrotropes in solutions", Chemical engineering & technology. Nov. 2011, pp. 225-237, [14 Pages].

Bera, Achinta, et al. "Screening of microemulsion properties for application in enhanced oil recovery", Fuel 121. Apr. 2014, pp. 198-207, [10 Pages].

Orzechowski, K. et al. "Complexation and proton transfer in the binary system propionic acid-triethylamine Evidence from the composition dependencies of mixture properties", Journal of molecular liquids. Mar. 2007, pp. 11-16, [6 Pages].

Zemb, Thomas N., et al. "How to explain microemulsions formed by solvent mixtures without conventional surfactants", Proceedings of the National Academy of Sciences, vol. 113, No. 16. Apr. 19, 2016, pp. 4260-4265, [6 Pages].

Maximo, Guilherme J., et al. "Lipidic protic ionic liquid crystals", ACS Sustainable Chemistry & Engineering. Apr. 2014, pp. 672-682, [11 Pages].

* cited by examiner

METHOD AND APPLICATIONS OF NONSTOICHIOMETRIC IONIC EMULSIONS

BACKGROUND

Surfactants and solvents are some of the most widely used compounds available in the hydrocarbon industry. They play a role in several stages of oil and gas production such as formulation of oil-based or water-based drilling muds, hydraulic fracturing, cementing fluids, acidization of oil wells, and enhanced oil recovery (EOR). Surfactants and solvents are useful because they create self-assembled molecular clusters called micelles in water or oil and adsorb to the interface between a solution and a different phase such as gases or solids.

Recently, ionic liquids have been used in several industries instead of traditional solvents and surfactants. Further, ionic liquids have demonstrated potential as alternatives to conventional surfactants used in the hydrocarbon industry. Mounting evidence suggests that ionic liquids possess reasonably well-defined structure in the bulk phase and this structure underpins the behavior of ionic liquids. Ionic liquid may participate in a variety of attractive interactions and may have an entropic component allowing higher order self-assembled structures. This ionic liquid self-assembly may underpin much of their complex chemical and physical behavior. Ionic liquid emulsions are also useful because they may be environmentally friendly since they are non-flammable and non-volatile.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to a method for synthesizing ionic liquid formulations using non-stoichiometric hydrophobic or hydrotropic ionic liquids, including aprotic or protic ionic liquids, to create emulsions, microemulsions, or nanoemulsions. A method for synthesizing ionic liquid formulations may include the steps of selecting a precursor, heating the precursor above a melting point of the precursor, adding the precursor to a second precursor to form a hydrophobic or hydrotropic ionic liquid, adding the ionic liquid to a fluid that forms a continuous phase such as water, and waiting a time to allow aggregation of the hydrophobic or hydrotropic ionic liquid to form a hydrophobic or hydrotropic emulsion. The precursor may be derived from plants, algae, oils, or fats. The method may include the steps of adding the precursor and the second precursor to obtain a non-stoichiometric ratio of precursors.

In another aspect, embodiments disclosed herein relate to a method for $CO_2$ sequestration within a reservoir, where an injection well traversing a subsurface into the reservoir is provided. An injection fluid containing an ionic liquid emulsion is introduced into the reservoir via the injection well. $CO_2$ is also introduced into the reservoir via the injection well and the injection fluid containing the ionic liquid emulsion intermingles with the reservoir fluid within the reservoir. The $CO_2$ may be concurrently introduced with the injection fluid into the reservoir via the injection well such that the $CO_2$ fluid intermingles and produces a foam within the reservoir. In another embodiment, the $CO_2$ may be introduced by alternating injections of $CO_2$ and the injection fluid. The reservoir pressure may be maintained at less than a fracture pressure of the reservoir.

In another aspect, embodiments disclosed herein relate a method for introducing an injection fluid within a reservoir, where an injection well and a production well traversing a subsurface into the reservoir are provided. An injection fluid containing an ionic liquid emulsion is introduced into the reservoir via the injection well, where the injection fluid containing the ionic liquid emulsion intermingles with a reservoir fluid within the reservoir. The intermingled injection fluid and the reservoir fluid are retrieved via the production well.

Other aspects and advantages will be apparent from the following description and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

DETAILED DESCRIPTION

Various illustrative embodiments of the disclosed subject matter are described below. In the interest of clarity, not all features of an actual implementation are described in this specification. It will of course be appreciated that in the development of any such actual embodiment, numerous implementation-specific decisions must be made to achieve the specific goals of the developers, such as compliance with system-related and business-related constraints, which will vary from one implementation to another. Moreover, it will be appreciated that such a development effort might be complex and time-consuming but may be a routine undertaking for those of ordinary skill in the art having the benefit of this disclosure.

The present subject matter is described below with reference to the attached figures. Various structures, systems, and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used should be understood and interpreted to have a meaning consistent with the understanding of those words and phrases by those skilled in the relevant art. No special definition of a term or phrase, that is, a definition that is different from the ordinary and customary meaning as understood by those skilled in the art, is intended to be implied by consistent usage of the term or phrase. To the extent that a term or phrase is intended to have a special meaning, that is, a meaning other than that understood by skilled artisans, such a special definition will be expressly set forth in the specification in a definitional manner that directly and unequivocally provides the special definition for the term or phrase.

Generally, ionic liquids are a subset of molten salts usually composed solely of ions. Ionic liquids are commonly appreciated to have melting points (Tm) below 100 degrees Celsius (° C.) and are usually liquids at ambient temperatures because of their chemical structure. Ionic liquids may be composed of two entities of opposite charges, a cation, and an anion. The anion and cation may be chosen to destabilize the solid-phase crystal formation; however, the ionic liquid may form a liquid crystal.

Evidence suggests that the ability to support amphiphile self-assembly is widespread among ionic liquids. Self-assembled ionic liquids may form nanoemulsions and microemulsions. Microemulsions and nanoemulsions are not defined by the size of the emulsion, but by the type of stability the microemulsions and nanoemulsions achieve. Microemulsions are thermodynamically stable and nanoemulsions are kinetically stable but not thermodynamically stable. For example, nanoemulsions may form larger emulsions if given enough time, but due to geometric factors or steric shielding this does not occur spontaneously.

A system for using hydrotropic and hydrophobic emulsions of ionic liquids in applications and their method of synthesis are proposed. Ionic liquid formulations according to embodiments of the present disclosure may include the use of non-stoichiometric ionic liquids, including aprotic or protic ionic liquids, for the creation of emulsions, microemulsions, or nanoemulsions. Additionally, ionic liquid formulations disclosed herein may be used to make liquid crystals, surfactant-free or detergentless microemulsions or nanoemulsions, or additives for aqueous or oil-based solutions. Microemulsions and nanoemulsions formed according to embodiments of the present disclosure may be used with saline aqueous solution such as sea water, brines, reject brines from desalination processes, or produced water. Formulating emulsions from hydrophobic or hydrotropic ionic liquids, as disclosed herein, may be useful because many precursors used to synthesize ionic liquids are present in naturally renewable sources such as vegetables, algae-based oils, and fats. For example, ionic liquids may be made in their entirety or partiality from first use, reused, recycled, or waste natural oils, fats, or acids, as well as their derivates (e.g., sourced from plant or algae).

In some embodiments, hydrotropic ionic liquids may be formulated based on at least one of alkylamines, dialkylamines, trialkylamines, alkanolamines, dialkanolamines, trialkanolamines, and tetralkanolamines and carboxylic acids (e.g., formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, and arachidic acid).

Additionally, ionic liquids formulations disclosed herein may be used in applications for the oil and gas industry, such as for decontaminating drilling fluids, enhancing the flowback of fracturing fluids, or $CO_2$ sequestration or conversion. For example, in a system using hydrotropic or hydrophobic ionic liquid emulsion in oil and gas industry applications, a fluid containing a hydrotropic or hydrophobic ionic liquid emulsion may be provided from the surface to the subsurface. The ionic liquid emulsion may be provided from an injection well that is part of a well environment. At the subsurface, the ionic liquid emulsion containing fluid may be used for applications including but not limited to enhanced oil recovery and $CO_2$ sequestration. The ionic liquid emulsion may be useful in a range of applications.

Methods are also described for synthesizing hydrotropic and hydrophobic ionic liquids. The synthesized hydrophobic and hydrotropic ionic liquids may be used to create nanoemulsions and micromulsions. In one or more embodiments the precursors of ionic liquid synthesis are derived from renewable sources.

Ionic Emulsion Synthesis Method

The following examples are merely illustrative and should not be interpreted as limiting the scope of the present disclosure.

Figure 1:
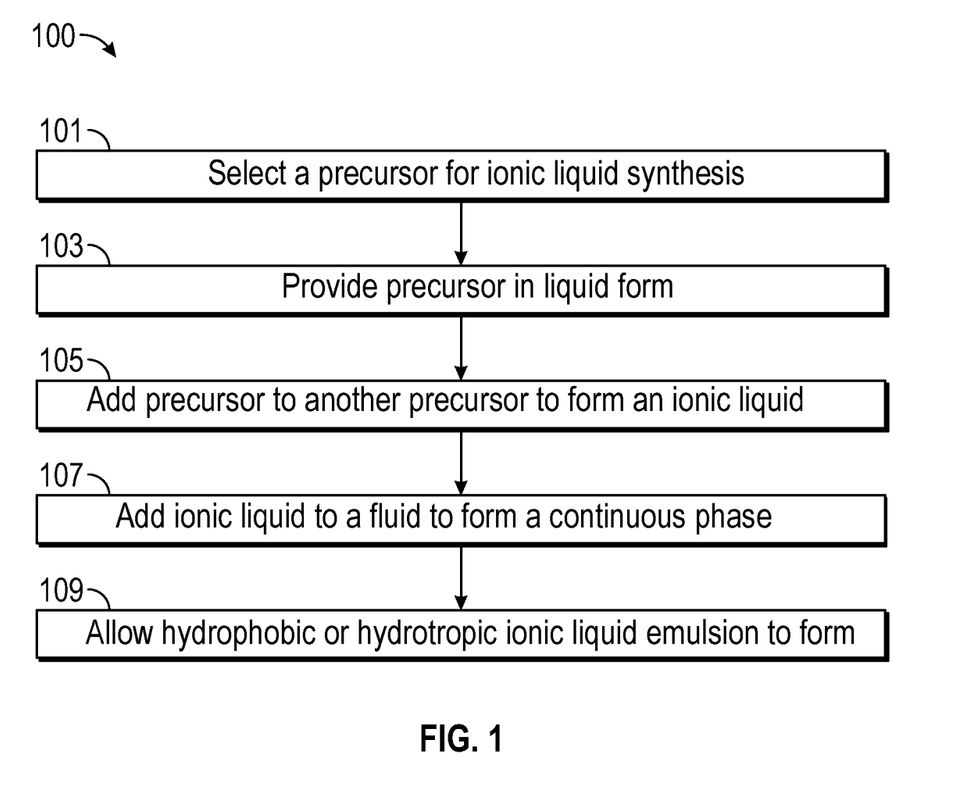
FIG. 1 illustrates a method according to one or more embodiments.

FIG. 1 diagrams a method 100 for synthesizing a hydrotropic or hydrophobic ionic liquid nanoemulsion or microemulsion (referred to as an ionic liquid emulsion for brevity). Terms such as hydrotropic or hydrophobic for an ionic liquid may be used relative to another hydrotropic or hydrophobic ionic liquid (hydrotropic or hydrophobic ionic liquid may be referred to as ionic liquid for brevity). For example, a mixture of a hydrophobic ionic liquid with a relatively less hydrophobic ionic liquid may facilitate the formation of a nanoemulsion or microemulsion in a fluid that forms a continuous phase such as water. Further, an ionic liquid precursor may be hydrophilic and still generate a hydrotropic or hydrophobic nanoemulsion or microemulsion when mixed with another ionic liquid precursor (e.g., when one of the components has a hydrophobic group or tail). In one or more embodiments, the ionic liquid emulsion is capable of mixing with oil and may be synthesized using non-stoichiometric amounts of a hydrophobic ionic liquid or a hydrotropic ionic liquid. Non-stoichiometric includes molar ratios diverging from one, where more moles of either positive or negative ionic liquids or the precursors thereof are present. Although method 100 diagrams two ionic liquid precursors, more than two ionic liquids precursors may be used for synthesizing hydrotropic or hydrophobic ionic liquid nanoemulsions or microemulsions according to one or more embodiments.

In a method 100 of synthesizing an ionic liquid emulsion of FIG. 1, step 101 shows that precursors for hydrophobic or hydrotropic ionic liquid synthesis are selected according to one or more embodiments. The hydrophilic and hydrophobic properties of ionic liquids may be modified by using precursors with different carbon chain lengths.

In one or more embodiments of step 101, protic ionic liquid may be used as precursor. Protic ionic liquids are formed by proton transfer from an equimolar combination of a Brønsted acid and a Brønsted base and may be treated as pure mixtures of ions. In some embodiments, aprotic ionic liquid may be used as a precursor.

In one or more embodiments of step 101, the ionic liquids may be synthesized from one more of alkylamine, dialkylamine, trialkylamine, alkanolamine, dialkanolamine, and trialkanolamine and carboxylic acids such as formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid or arachidic acid.

In one or more embodiments of step 101, a precursor that is selected may be derived from natural sources including but not limited to plants, algae, oils or fats. For example, esters of pelargonic acid are found in the oil of *pelargonium* plant leaves, decanoic acid occurs in coconut oil and palm kernel oil, and stearic acid is abundant in animal fat. In one or more embodiments of step 101, the properties of an ionic liquid emulsion may be altered by varying the length of the carbon chains of the precursor molecules. For example, if the carbon chain length is increased for the hydrophobic phase of a precursor, the hydrophobicity of the center of the ionic liquid emulsion may increase. If the chain length is shortened for the interfacial ionic liquid, the solubility may be increased, and the size of the ionic liquid emulsion may increase in thermodynamic equilibrium, although it may be reduced by using a high energy method in kinetically stable nanoemulsions.

In a method 100 of synthesizing an ionic liquid emulsion of FIG. 1, step 103 shows that a precursor for hydrophobic or hydrotropic ionic liquid synthesis may be provided as a liquid according to one or more embodiments. In one or more embodiments the precursor may be heated to obtain a liquid form; however, heat may not be required if a precursor is liquid at room temperature. A solid precursor may be heated until a liquid phase of the precursor is achieved; however, heat may not be required to melt a precursor if it is already in liquid form. In some embodiments, an ionic liquid precursor may be in liquid form in temperatures at or below 100° C. The heating temperature may be maintained above the melting point of the ionic liquid but as low as possible to avoid issues such as oxidation during ionic liquid synthesis.

In a method 100 of synthesizing an ionic liquid emulsion of FIG. 1, step 105 shows that a precursor for ionic liquid synthesis may be added to another precursor to form an ionic liquid according to one or more embodiments. The precursors may be added in liquid form.

In one or more embodiments of step 105, an excess amount of a precursor compound is added to another precursor compound to obtain a stoichiometric ratio. Ionic liquid may be more thermally stable in non-stoichiometric ratios of compounds compared to stoichiometric ratios of compounds. For example, non-stoichiometric ratios may be useful because of the ability of carboxylic acids to form dimers. The carboxylic dimers paired to a trialkylamine make the ionic liquid more difficult to evaporate, in comparison to a stoichiometric pairing of one to one of acid and base.

In step 105, the hydrophobic or hydrotropic ionic liquid may aggregate according to one or more embodiments. Further, an ionic liquid may aggregate to form a liquid crystal according to one or more embodiments. Even though the precursors using ionic liquid synthesis may be sparingly soluble in water, the mixture may eventually be used to form a water soluble hydrotropic or hydrophobic ionic liquid emulsion.

In a method 100 of synthesizing an ionic liquid emulsion of FIG. 1, step 107 shows that a fluid may be added to the ionic liquid, where the fluid may form a continuous phase of the mixture, according to one or more embodiments. In one or more embodiments, water may be used as fluid to form the continuous phase and may be referred to as the continuous phase or the water phase. After addition of water, an "ouzo" type of solution may form because of the ouzo effect where a hydrophobic or hydrotropic compound shows spontaneous emulsification due to Ostwald ripening. In one or more embodiments, the water added to form the continuous phase may be present at a volume of above 50% (percent) of the total volume of the ionic liquid emulsion. For example, in some large field applications, ionic liquid may be added to an aqueous solution (e.g., treated or non-treated sea water) in an amount to where the aqueous solution may form about 98% of the total volume of the ionic liquid emulsion.

In a method 100 of synthesizing an ionic liquid emulsion of FIG. 1, step 109 shows allowing an ionic liquid emulsion to form according to one or more embodiments. In one or more embodiments, the ionic liquid may be mixed with the continuous phase fluid to allow ionic liquid emulsion formation. In one or more embodiments, waiting a period of time may be required to allow aggregation in the ionic liquid to form an ionic liquid emulsion.

In one or more embodiments, the stability or the size of an ionic liquid emulsion may be maintained or further enhanced by modifying the salinity of the continuous phase. Further, the Ostwald ripening may be modified by increasing salinity. Generally, greater salinity may provide greater stability for ionic liquid emulsions in some applications, for example, applications with high salinity such as sea water or reservoirs with brine. The zeta potential of an ionic liquid emulsion may be used to determine the stability of an ionic liquid emulsion. The zeta potential is the potential difference existing between the surface of a solid particle or ionic liquid emulsion particle immersed in a liquid (e.g., water or oil) and the bulk of the liquid. Generally, the greater the absolute value (either negative or positive) of the zeta potential the greater the stability In one or more embodiments ionic liquid emulsion particles may be configured to have sizes small enough to enter reservoir pores, which may improve enhanced oil recovery. For example, ionic liquid emulsion particles may range in size from the nanometer range to a couple of hundreds of microns in diameter.

In one or more embodiments, a synthesized ionic liquid may be mixed with another synthesized ionic liquid to form an ionic liquid mixture. In one or more embodiments, the range for combining two or more of the ionic liquids with different hydrophobicity may range from 0.001% to 99.999% on a molar ratio basis. For example, if two ionic liquids with different hydrophilicity are used, a first ionic liquid may form 0.001% of the ionic liquid mixture and a second ionic liquid may form the remainder of the ionic liquid mixture. In some embodiments, three or more ionic liquids with different hydrophilicity may be mixed, where each of the ionic liquids may form between 0.001% to 99.999% on a molar ratio basis of the mixture. In one or more embodiments, two or more ionic liquid emulsion mixtures may be combined. In one or more embodiments, an ionic liquid emulsion mixture could be formed inside another an ionic liquid emulsion ("matryoshka" style).

Ionic Emulsion Synthesis Method Experiment

The following examples are merely illustrative and should not be interpreted as limiting the scope of the present disclosure.

A hydrotropic microemulsion capable of mixing with oil was synthesized using non-stoichiometric amounts of a hydrophobic ionic liquid and a hydrotropic ionic liquid. Decanoic acid ($C_{10}H_{20}O_2$) was used as a precursor for ionic liquid synthesis. Decanoic acid is a C10, straight-chain saturated fatty acid. Decanoic acid is a crystalline solid at room temperature with a melting point 31.5 Celsius (° C.). The solid decanoic acid may be heated in a flask to 35° C. until a liquid phase of decanoic acid is achieved.

Triethylamine ($C_6H_{15}N$) was also used as a precursor for ionic liquid synthesis and added to the decanoic acid. Triethylamine is a clear and colorless liquid at room temperature. Triethylamine was added dropwise under vigorous stirring using a magnetic stirring bead on top of a hot plate to the liquid decanoic acid until a stoichiometric ratio of 0.7:1 for triethylamine to decanoic acid was obtained. The reaction was performed in the presence of water; however, unreacted triethylamine separated from the water.

After a homogenous solution was achieved by mixing, the excess amount of triethylamine added to the decanoic acid was thermally evaporated by a hot plate. Specifically, the triethylamine-decanoic acid solution was left overnight on the hot plate at a temperature of around 85° C. Next, the plate temperature was increased to 115° C. until no more water was observed to evaporate. An Infrared thermometer indicated the solution was at 105° C. although it is just considered for indicative purposes. This yields an approximate triethylamine to decanoic acid ratio of 1:1.6. Alternatively, the excess amount triethylamine may be evaporated by vacuum after a homogenous solution is achieved by mixing.

The precursors triethylamine and decanoic acid are sparingly soluble in water; however, the triethylamine-decanoic acid mixture forms a water soluble hydrotropic ionic liquid. The triethylamine-decanoic acid ionic liquid forms particles of approximately 1.4 nanometers (nm) in size according to dynamic light scattering (DLS) measurements.

In another example experiment, a hydrophobic ionic liquid was synthetized by adding stearic acid ($C_{18}H_{36}O_2$) to triethylamine to make a triethylamine-stearic acid ionic liquid.

Stearic acid is a C18, straight-chain saturated fatty acid. Stearic acid is a colorless and wax-like solid at room temperature with a melting point 68.8° C. The solid stearic acid was heated to about 75° C. until a liquid phase was achieved. In some embodiments, solid stearic acid may be heated to a maximum temperature of about 85° C. to achieve a liquid phase.

Triethylamine was added dropwise under vigorous stirring using a magnetic stirring bead on top of a hot plate to the liquid stearic acid until a stoichiometric ratio of triethylamine to stearic acid in the ionic liquid. The reaction was performed in water and a homogenous solution was achieved by mixing with a stoichiometric ratio of triethylamine to stearic acid of around 0.85:1. After a homogenous solution was achieved by mixing, the excess amount of triethylamine and water added to the stearic acid was thermally evaporated by a hot plate to achieve a stoichiometric ratio of triethylamine to stearic acid of around 0.62:1.

The triethylamine-stearic acid ionic liquid has different properties from the triethylamine-decanoic acid ionic liquid. As shown in 202 of FIG. 2, triethylamine-stearic acid ionic liquid with water forms a hydrophobic ionic liquid 201 that may separate from the water even after stirring.

Figure 2:
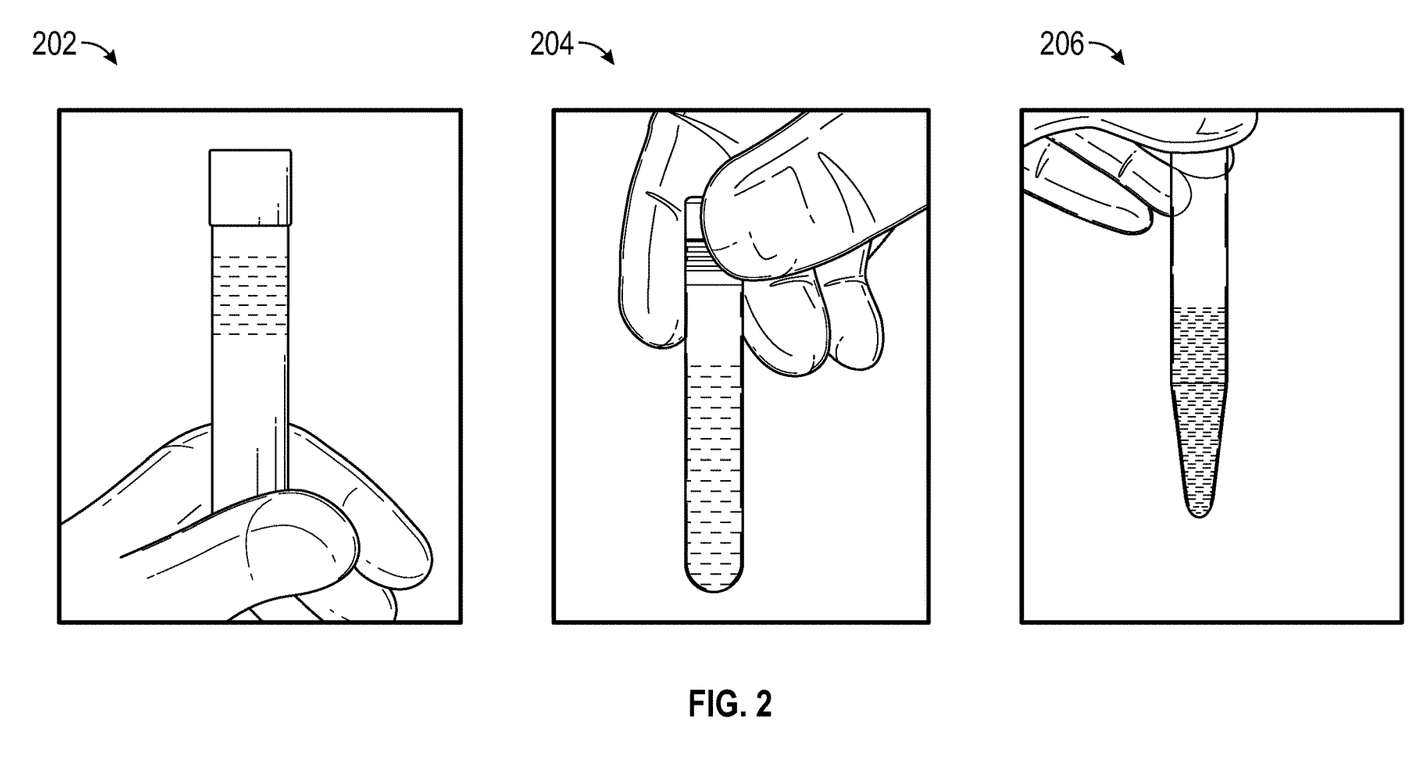
FIG. 2 illustrates a method according to one or more embodiments.

The triethylamine-decanoic acid ionic liquid was added to the triethylamine-stearic acid ionic liquid in approximately a 1 to 1 ratio by volume (or other ratio) to create an ionic liquid mixture. Then water was added to the ionic liquid mixture create an ionic liquid emulsion. The mixture was further mixed by flipping the vial upside down a few times. Initial DLS measurements show that the emulsion is an ionic liquid nanoemulsion with a size range of approximately 1 to 100 nm. The ionic liquid nanoemulsion aggregated to form an ionic liquid microemulsion with an aggregate size of approximately 5.5 micrometers (um).

Deionized water at a temperature of approximately 95° C. was added to the ionic liquid mixture. Approximately, 3 mL (milliliters) of the ionic liquid mixture was added, and 7 mL of deionized water was added. As shown in FIG. 2, after addition of water, an ionic liquid emulsion 204 formed an "ouzo" type of mixture where the ionic liquid emulsion 204 exhibits hydrotropic properties.

The ionic liquid emulsion 204 was added to crude oil in an approximately 1 to 1 ratio. The temperature of the ionic liquid emulsion and the crude oil was about 95° C. The ionic liquid emulsion 204 and the crude oil were mixed by inverting the vial. FIG. 2 shows the crude oil and ionic liquid emulsion 206 approximately 15 minutes after mixing. The ionic liquid emulsion facilitated the mixture of crude oil and water in a continuous phase.

In one or more embodiment, the compound used to make ionic liquids used may be a carboxylic acid.

In one or more embodiment, the compound used to make ionic liquids may be sulfonates.

Thermodynamically stable micromulsions or kinetically stable nanoemulsions composed of non-stoichiometric hydrotropic ionic liquids or hydrophobic ionic liquids according to embodiments of the present disclosure may be used in oilfield applications. As discussed above, methods may include formulating hydrotropic or hydrophobic ionic liquids based on alkylamines and carboxylic acid (or similar compounds). The ionic liquids may be synthesized from first use, reused, recycled, or waste natural oils, fats, or acids and their derivates. Also, liquid crystals may be synthesized from the ionic liquids. Further, the ionic liquids are used to create ionic liquid emulsions that may be used in a surfactant-free and detergent-free environment. The ionic liquid emulsions may be used with saline aqueous solutions. Some other uses of the ionic liquid emulsions may include additives for an aqueous or oil-based solution; non-polar or oil phase for microemulsions or nanoemulsions; decontaminating drilling fluids or enhancing the flow back of fracturing fluids; and incorporating CO2 into the solutions as a means of CO2 sequestration or conversion.

Example Applications

Figure 3:
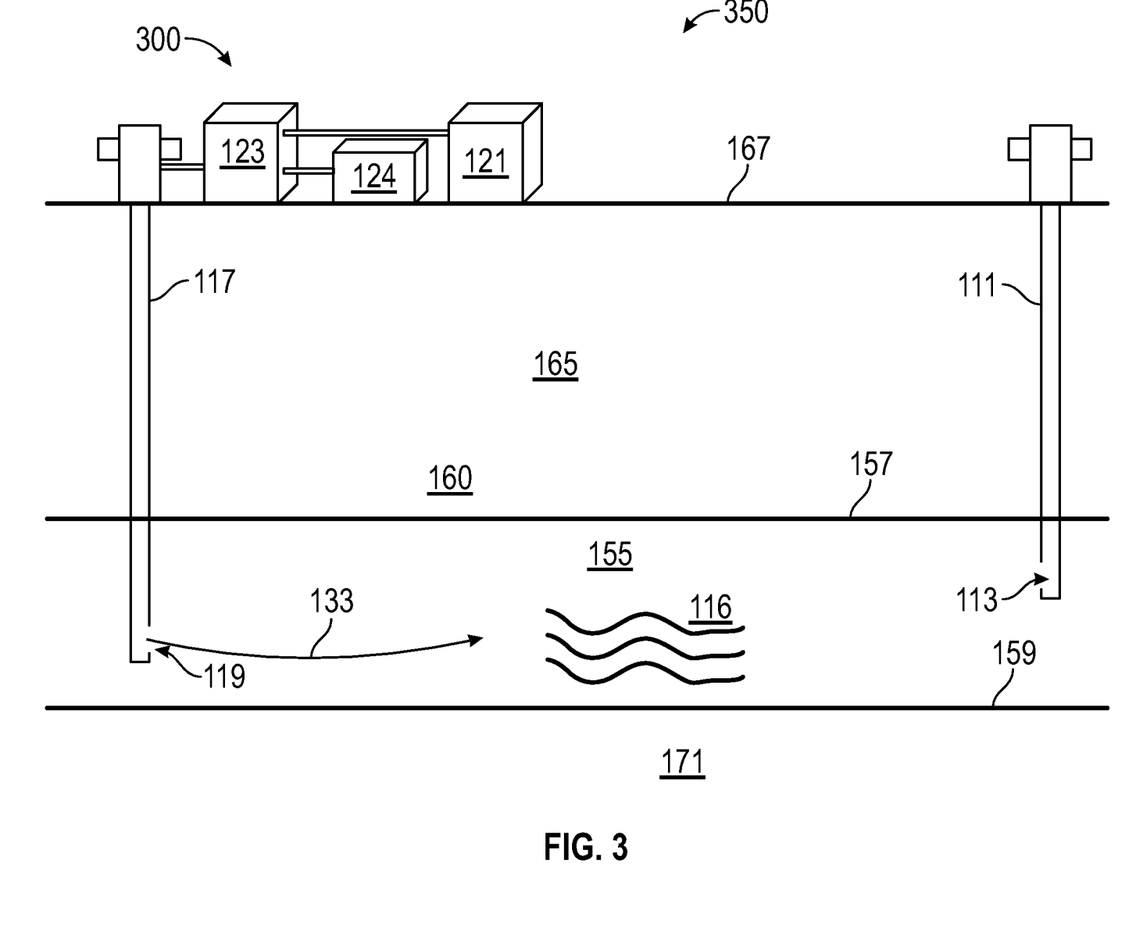
FIG. 3 is a diagram of a system according to one or more embodiments.

FIG. 3 is a diagram of a well environment system used to introduce ionic liquid emulsion from the surface into the subsurface in accordance with one or more embodiments. The well environment 350 includes a reservoir 155 having a reservoir upper interface 157 and a reservoir lower interface 159. Above the reservoir upper interface 157 is a fluid-impenetrable overburden 160, which is part of subsurface 165. Below the reservoir lower interface 159 is the underburden 171, which is also part of the subsurface 165.

The reservoir may comprise matrix materials including, but not limited to, limestone, sandstone, and shale. Other matrix materials may be unconventional, including, but not limited to, marble, granite, or basalt. Further, the specific type of a reservoir formation, such as sandstone, limestone, and shale, may determine the specific ionic liquid emulsion utilized in the solution.

The well environment 350 also includes a surface 167 representing the surface of the Earth, and a subsurface 165 below the surface 167. Traversing through subsurface 165 environment is a portion of a well injection system 300, which is part of the well environment 350. The well injection system 300 includes an injection well 117. A bottomhole 119 of the injection well 117 is positioned proximate to the reservoir lower interface 159 but within the reservoir 155, which may be depleted. In one or more embodiments, the underburden 171 is porous and permits migration of fluids and gases. In some embodiments, the injection well 117 may transverse into the underburden 171 and bottomhole 119 of the injection well 117 is positioned in the underburden 171.

The well injection system 300 may include surface equipment for pumping fluids into the injection well, such as fluid sources fluidly connected via flowlines to a wellhead on the injection well 117, valves, controls, and pumps for pumping fluid from the fluid sources into the injection well 117. FIG. 3 shows ionic liquid emulsion as one such fluid source stored on the surface 167 in an emulsion storage 124. In one or more embodiments, the well injection system 300 may also comprise a carbon dioxide storage (CO2 storage) 121. In one or more embodiments, the well injection system 300 may also be configured to have additional components including but not limited to, an inline gas injector (e.g., venturi mixing), boiler tank, water tank, brine tank, additive tanks, emulsion reactors, and mixers.

In one or more embodiments, the well environment 350 includes a production well 111. A bottomhole 113 of the production well 111 may be positioned proximate to the reservoir lower interface 159 but within the reservoir 155. The production well 111 may comprise a lifting system, such as a pump, for elevating oil to surface. In one or more embodiments, the production well 111 may transverse into the underburden 171 and bottomhole 113 of the production well 111 may be positioned in the underburden 171.

Although the injection well 117 and production well 111 of the system in FIG. 3 shows a vertical well, the configuration of the injection well or the production well configuration itself is not so limited. The configuration of any injection well or production well may be vertical, approximately vertical, deviated, approximately horizontal, horizontal, and combinations thereof. The injection well or production well may also be a multi-lateral, a multi-level, or both types.

In one or more embodiments, the ionic liquid emulsion stored in the emulsion storage 124 may be introduced into the reservoir 155 from the injection well 117 as a component of an injection fluid 133. The injection fluid 133 traverses into reservoir 155 from the bottomhole 119 (see arrow) of the injection well 117, as shown in FIG. 3. In one or more embodiments, the injection fluid 133 may contain additional compounds including but not limited to, polymers, surfactants, saline solution, viscosity modifiers, thickening agents, gelling agents, water, aqueous solutions, gas bubbles, acids and bases. In one or more embodiments, there may be several sources for the saline solution including, but not limited to sea water, brines, reject brines from desalination processes or produced water. The saline solution and the ionic liquid emulsion may be mixed in a mixing tank or by in-line mixing methods (e.g., injection of the ionic liquid into a saline solution flow line). In one or more embodiments, the ionic liquid emulsion is present in a range from about 0.0001 vol % (volume percent) to 2 vol % in the total injection fluid.

In one or more embodiments, carbon dioxide (CO2) is also injected to maximize a sweep efficiency. The ionic liquid emulsion and the CO2 may be intermixed in a mixing tank 123 before injection into the reservoir 155 as an injection fluid. The CO2 may be in the state of a gas, a liquid, a critical fluid, or a supercritical fluid. However, CO2 has very low density in a gaseous state compared to the density of formation fluids, such as brine and hydrocarbons. The very low density increases the upward mobility of the CO2. In contrast, both liquid and supercritical CO2 have greater densities than CO2 gas. The densities of liquid, critical, and supercritical CO2 are much closer to the densities of formation fluids in the reservoir. The similar density of the liquid, critical, and supercritical CO2 with respect to the formation fluids reduces the upward mobility of CO2. The denser phases of CO2, whether liquid, critical, or supercritical, are useful but not exclusive. In one or more embodiment the CO2 may be diluted within the ionic liquid emulsion containing the injection fluid 133. In one or more embodiments, the CO2 may be concurrently introduced with the injection fluid 133. The concurrently introduced CO2 and injection fluid 133 may be co-injected. When CO2 and the injection fluid 133 are co-injected, the CO2 and the injection fluid may intermingle, and a foam-like mixture may form. In one or more embodiments, the CO2 and the injection fluid 133 may be introduced by alternating injections of injection fluid 133 and CO2.

The injection fluid 133 traverses into the reservoir 155 for some distance away from the bottomhole 119 of the injection well 117. In one or more embodiments, the injection fluid 133 may be driven by a water bank that moves through a formation within the reservoir 155. The injection fluid 133 may mix and intermingle with a reservoir fluid that may include but is not limited to oil 116 and/or other hydrocarbons in the reservoir 155. The ionic liquid emulsion in the injection fluid 133 may alter wettability of oil-wet rock surfaces and reduce interfacial tension (IFT) between water and the oil 116 phase. In such manner, the injection fluid 133 mobilizes formation fluids including but not limited to oil 116 and other hydrocarbons that are trapped and forces them towards the production well 111 where the formation fluids may be retrieved from the bottomhole 113 of the production well 111. In one or more embodiments, the ionic liquid emulsion injection may be part of an enhanced oil recovery (EOR) process following a secondary recovery. In one or more embodiments, the ionic liquid emulsion injection may be part of an EOR operation following a primary recovery.

Introduction of fluid containing ionic liquid emulsion and CO2 is not so limited to be introduced into merely hydrocarbon-bearing formations. In one or more embodiments, the injection fluid may be used for CO2 sequestration. The injection fluid may be introduced into conventional formations and reservoirs, such as, but not limited to, deep saline aquifers, or basaltic formations, and unconventional reservoirs, such as, but not limited to, coal beds and fractured or tight gas formations. In one or more embodiments, injection fluid 133 used in CO2 sequestration may contain ionic liquid emulsions where the ionic liquids have high CO2 solubility and could be used for the hydrophobic phase. In one or more embodiments, an ionic liquid emulsion may include additional compounds, such as polymers, surfactants, salts, viscosity modifiers, thickening agents, gelling agents, other gases (H2S), acids and/or bases. The amount of CO2 introduced may vary in relation to the amount of ionic liquid emulsion present in the injection fluid 133. In one or more embodiments, the CO2 is present in an approximate molar ratio of CO2 to ionic liquid emulsion that ranges from 1.1:1 to 10:1.

For CO2 sequestration, the reservoir pressure may be monitored and maintained at a particular value less than the fracture pressure of the reservoir. Further, the well injection system may not include a recovery or production well if the system is used for CO2 sequestration. For a CO2 sequestration method, a depleted reservoir has already had productive hydrocarbons extracted.

Various mechanisms ensure that mixtures of an introduced CO2 and emulsion combination is eventually trapped and sequestered in a depleted reservoir. Some mechanisms for CO2 trapping inside the depleted hydrocarbon-bearing formation may include static trapping, structural trapping, stratigraphic trapping, hydrodynamic trapping, and capillary trapping.

FIG. 3 provides one exemplary application of emulsion for subsurface applications. However, one of ordinary skill in the art would recognize that the system of FIG. 3 is non-limiting and that ionic liquid emulsions according to embodiments of the present disclosure may be used for other subsurface applications, such as drilling.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

"Optionally" and all grammatical variations thereof as used refers to a subsequently described event or circumstance that may or may not occur. The description includes instances where the event or circumstance occurs and instances where it does not occur.

The term "substantially" and all grammatical variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims.

What is claimed is:

1. A method, the method comprising:
   selecting a first precursor;
   providing the first precursor in liquid form;
   adding the first precursor to a second precursor to form a hydrophobic or hydrotropic ionic liquid, wherein the first precursor and the second precursor are provided in amounts to obtain a non-stoichiometric ratio of precursors;
   adding the hydrophobic or hydrotropic ionic liquid to a continuous phase fluid; and
   forming a stable ionic liquid emulsion from aggregation of only the hydrophobic or hydrotropic ionic liquid in the presence of the continuous phase fluid.

2. The method of claim 1, wherein the first or second precursor is selected from alkylamines, dialkylamines, trialkylamines, alkanolamines, dialkanolamines, and trialkanolamines.

3. The method of claim 1, wherein the first or second precursor is selected from a carboxylic acid selected from formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid.

4. The method of claim 1, wherein the first or second precursor is derived from plants, algae, oils or fats.

5. The method of claim 1, wherein the hydrophobic or hydrotropic ionic liquid is protic.

6. The method of claim 1, wherein the hydrophobic or hydrotropic ionic liquid is aprotic.

7. The method of claim 1, wherein the hydrophobic or hydrotropic ionic liquid is added to a second ionic liquid to form an ionic liquid mixture before the continuous phase fluid is added.

8. The method of claim 1, wherein the continuous phase fluid is present at a volume above 50% of the total volume of the hydrophobic or hydrotropic ionic liquid emulsion.

9. The method of claim 1, wherein the continuous phase fluid is formed by water.

10. The method of claim 1, wherein the first precursor is heated above a melting point of the first precursor to provide the first precursor in liquid form.

* * * * *